(No Model.)
M. A. WILLIAMS.
OVEN REGULATOR.
No. 523,253.
Patented July 17, 1894.
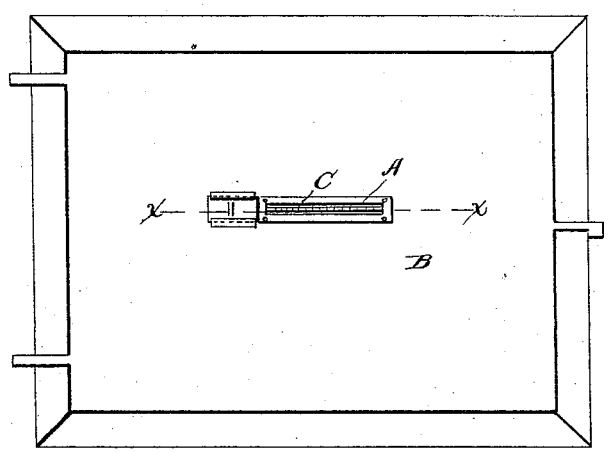
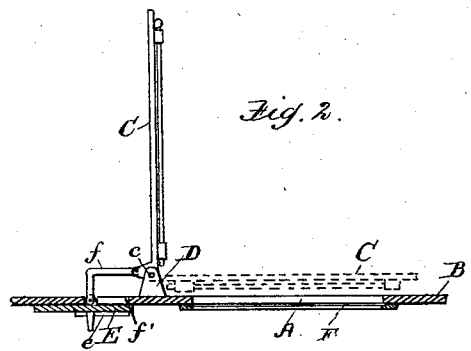
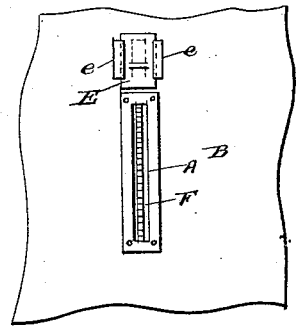
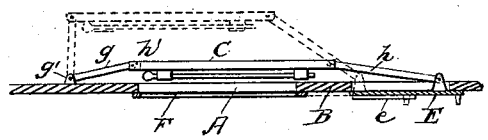
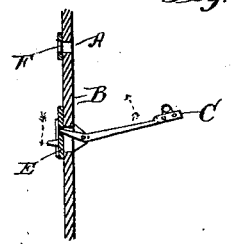
Witnesses:
W. H. H. Knight
Harry J. Bamford
Inventor.
Mary A. Williams
by Edson Bro's
Attorneys.

UNITED STATES PATENT OFFICE.

MARY A. WILLIAMS, OF KANSAS CITY, MISSOURI.

OVEN-REGULATOR.

SPECIFICATION forming part of Letters Patent No. 523,253, dated July 17, 1894.

Application filed April 18, 1894. Serial No. 507,974. (No model.)

*To all whom it may concern:*

Be it known that I, MARY A. WILLIAMS, a citizen of the United States, residing at Kansas City, in the county of Jackson and State of Missouri, have invented certain new and useful Improvements in Oven-Regulators; and I do hereby declare the following to be a full, clear, and exact description of the invention, such as will enable others skilled in the art to which it appertains to make and use the same.

The nature of the present improvement is a means for indicating the temperature of an oven to enable the attendant cook to ascertain whether it is in condition for properly cooking different kinds of foods which, as is well known to those skilled in the art, require different temperatures according as it is desired to bake the food fast or slow.

The object that I have in view is to provide means which can be adjusted some distance within the oven chamber so as to be exposed to the direct action of the heat circulating therein, and to combine with such indicating devices certain manually operative devices that can be controlled from the outside of the oven and its door to bring the indicator into convenient position for viewing the same through a slot in the oven door and which operating devices can be operated to project the indicator within the oven chamber and away from the door so as to be exposed to the circulating heat.

With these and such other objects in view as pertain to my invention, it consists primarily in a thermometer movably supported in relation to a viewing slot in the oven, and an external slide mounted outside of the oven chamber and connected with said movable thermometer frame to control the position thereof relative to the viewing slot. And the invention further consists in the peculiar construction and combination of parts which will be hereinafter fully described and claimed.

To enable others to fully understand my invention, I have illustrated different embodiments thereof in the accompanying drawings, forming a part of this invention, and in which—

Figure 1 is a front elevation of an oven door with a horizontal mica-covered slot therein and a horizontally swinging thermometer frame, and Fig. 2 is a horizontal sectional view on the plane indicated by the dotted line $x$—$x$ of Fig. 1, the dotted lines illustrating the position assumed by the thermometer frame when it was adjusted close to and opposite the view slot. Fig. 3 is a vertical sectional view through a modified construction in which the thermometer frame is mounted on a horizontal pivot to swing in a vertical plane and adapted for use in connection with a vertically movable actuating slide to bring said thermometer frame close to or away from the vertical slot. Figs. 4 and 5 are sectional views through other modified constructions by which the thermometer frame may be adjusted close to or away from the view slot and preserve a position at all times parallel to the oven door.

Like letters of reference indicate corresponding parts in all the figures of the drawings, referring more particularly to Figs. 1 and 2, of which—

A designates a viewing slot which is cut or otherwise formed in the door B of a baking oven. This slot is horizontal in the preferred embodiment of my invention, and the thermometer-frame C is hung on a vertical pivot $c$ to swing in a horizontal plane toward and in line with the horizontal view slot A or to be projected well into the oven at right angles to the door, for the purpose of subjecting the mercury or other fluid in the thermometer tube to the action of the heat circulating around the oven.

The thermometer may be of the ordinary well known pattern, *i. e.*, a glass tube with a bulb at one end, a frame, and a graduated scale which is fixed to the frame and has the tube fastened thereto, but the detailed construction of the thermometer may be varied or changed without departing from the spirit of my invention. One end of this horizontally swinging thermometer frame is supported by the vertical pivot $c$ on a suitable lug or bracket D which is rigid with the door B, on the inside thereof, and at one end of the horizontal slot A.

To enable the thermometer to be readily adjusted from the outside of the oven and thus avoid the objection of opening the door and permitting the heat to escape, I provide a manually operative slide E on the outside of the door and connections between such slide E and the swinging thermometer frame so arranged that a movement of the slide in one direction acts to throw the thermometer frame at right angles to the door and thus expose the mercury in the tube to the circulation of heat, while a reverse movement of the slide turns the thermometer to a position opposite to and in line with the view slot so that the temperature of the oven can be readily ascertained. The slide E is guided between suitable flanges or guides $e$ on the oven door, and a crank arm $f$ is used to connect the thermometer frame and the slide. This crank arm $f$ passes through a slot $f'$ in the door, and it is loosely attached to the slide which fits over and closes the slot $f'$, said arm being made rigid or fast to the thermometer frame, and loosely fitted on the vertical pivot or stud $c$ so as to turn thereon when the slide is moved and swing the thermometer frame parallel with the oven door or at right angles thereto.

In the modified construction shown by Fig. 3, the viewing slot is cut vertically in the oven door, and the thermometer frame is hung at its upper end by a horizontal pivot, so that the thermometer can be swung in a vertical plane and be caused to stand at right angles to the oven door or parallel thereto and in line with the viewing slot. The crank arm is fast to the thermometer frame, and it passes through a slot or opening $f'$ in the door to connect with the slide E which is guided to move vertically between guide ways or flanges $e$.

I also contemplate a construction by which the movable thermometer is held in a position at all times parallel to the oven door and viewing slot while at the same time it is capable of adjustment toward or from the viewing slot. In Figs. 4 and 5 of the drawings the thermometer frame is shown supported by links $g$, $h$, which are disposed at opposite ends of the thermometer frame, the links being pivoted to lugs on the door at $g'$ and being pivotally connected to the thermometer frame at $h'$ whereby the links serve to maintain the thermometer parallel to the door and also permit it to move into the oven so as to be exposed to the circulating heat or to be brought close to and in line with the viewing slot.

The thermometer supported by the links may be disposed in a vertical position as shown by Fig. 4 or in a horizontal position shown by Fig. 5, and the frame is adjusted from the outside of the oven door by means of the slide E which is guided on the door B.

The viewing slot is covered by a pane of mica, or other suitable transparent material, F, in all cases, to prevent escape of the heat and admit light to enable the attendant cook to ascertain the register of the thermometer.

The operation of my improvements will be readily understood from the foregoing description taken in connection with the drawings, but I would here remark that as the horizontally pivoted thermometer frame shown by Fig. 3 is liable to strike against an oven shelf or the food being cooked in the oven while it is moving in a vertical direction, I prefer to employ the horizontally swinging thermometer which can be located in the upper portion of the oven to swing clear of the food being cooked in the oven.

I am aware that changes and alterations in the form and proportion of parts and in the details of construction of the mechanisms herein shown and described as embodiments of my invention can be made without departing from the spirit or sacrificing the advantages thereof, and I therefore reserve the right to make such modifications as fairly fall within the scope of my invention.

Having thus fully described my invention, what I claim as new, and desire to secure by Letters Patent, is—

1. The combination with an oven having a viewing slot therein, of a movable thermometer supported within the oven, and a slide mounted outside of the oven and connected with said thermometer, substantially as and for the purposes described.

2. The combination with an oven having a viewing slot, of a thermometer pivoted in close relation to the viewing slot, and means outside of the oven to adjust the pivoted thermometer toward or from the viewing slot, substantially as and for the purposes described.

3. The combination with an oven having a viewing slot, of a thermometer pivoted at one end in close relation to the slot and adapted to turn on its pivot at right angles to the slot or parallel to the same, and a slide connected to said pivoted thermometer, substantially as and for the purposes described.

4. The combination of an oven having a horizontal viewing slot, a horizontally swinging thermometer supported at one end on a vertical pivot, and a slide connected with said pivoted thermometer, substantially as and for the purposes described.

5. The combination with an oven having a mica-covered slot, of a thermometer pivoted at one end of said view slot and capable of adjustment at right angles to and in line with the view slot, a slide guided on the outside of the door, and an arm connecting the pivoted thermometer and slide, substantially as and for the purposes described.

6. The combination with an oven having a mica-covered view slot and an opening, a pivoted thermometer, a slide guided over the opening on the oven, and an arm connected to the slide and pivoted end of the thermometer, substantially as and for the purposes described.

In testimony whereof I affix my signature in presence of two witnesses.

MARY A. WILLIAMS.

Witnesses:
JNO. W. WILLIAMS,
MARK WILLIAMS.